(12) United States Patent
McKaskle et al.

(10) Patent No.: US 8,799,865 B2
(45) Date of Patent: Aug. 5, 2014

(54) INTEGRATED DATA VIEWER

(75) Inventors: Gregory A. McKaskle, Austin, TX (US); Christina C. Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1058 days.

(21) Appl. No.: 12/534,626

(22) Filed: Aug. 3, 2009

(65) Prior Publication Data

US 2011/0029955 A1 Feb. 3, 2011

(51) Int. Cl.
*G06F 9/44* (2006.01)
*G06F 3/00* (2006.01)

(52) U.S. Cl.
CPC ........................................ *G06F 8/38* (2013.01)
USPC .......................................... 717/125; 715/704

(58) Field of Classification Search
USPC ....................................................... 717/125
See application file for complete search history.

(56) References Cited

U.S. PATENT DOCUMENTS

| | | | |
|---|---|---|---|
| 5,481,741 A * | 1/1996 | McKaskle et al. | 345/522 |
| 6,760,665 B1 * | 7/2004 | Francis | 702/6 |
| 7,134,085 B2 | 11/2006 | Austin | |
| 2003/0160822 A1 * | 8/2003 | Belz et al. | 345/762 |
| 2003/0222919 A1 * | 12/2003 | Brendle | 345/781 |
| 2007/0226253 A1 * | 9/2007 | Matsubara | 707/104.1 |
| 2008/0109712 A1 * | 5/2008 | McBrearty et al. | 715/208 |
| 2010/0179847 A1 * | 7/2010 | Cope et al. | 705/8 |

* cited by examiner

*Primary Examiner* — Elias Mamo
*Assistant Examiner* — John Roche
(74) *Attorney, Agent, or Firm* — Meyertons Hood Kivlin Kowert & Goetzel, P.C.; Jeffrey C. Hood; Mark K. Brightwell

(57) ABSTRACT

System and method for recording and displaying data associated with a program executing a program. Data associated with the program is displayed in a first instance of a graphical user interface (GUI) element. The data are saved one or more times during or after execution of the program in response to input, including saving information regarding the GUI element. The saved data are then displayed in a second instance of the GUI element in response to user input invoking display of the saved data, based on the saved information regarding the GUI element.

22 Claims, 12 Drawing Sheets

INTEGRATED DATA VIEWER

FIELD OF THE INVENTION

The present invention relates to the field of programming, and more particularly to a system and method for recording and displaying data associated with a program, e.g., input and/or output of the program.

DESCRIPTION OF THE RELATED ART

Traditional programming approaches typically focus on program code, relegating data to a minor role or ignoring it altogether. However, in many applications data may be as important as the program. However, prior art program development environments do not readily facilitate loading, saving, or viewing data, and so a separate program, if available at all, must generally be invoked for such functionality.

Thus, improved systems and methods for recording and displaying data associated with a program, e.g., input and/or output of the program, are desired.

SUMMARY OF THE INVENTION

Various embodiments of a system and method for recording and displaying data associated with a program, e.g., input and/or output of the program, are presented below.

First, a program may be executed, where executing the program may include displaying data associated with the program in a first instance of a graphical user interface (GUI) element. In other words, during execution of the program, input and/or output data of the program may be displayed in a GUI. In some embodiments, the data may continue to be displayed after execution of the program is complete, e.g., the first instance of the GUI may still be visible (with the displayed data) after execution of the program.

The data may be saved one or more times during and/or after execution of the program in response to input, including information regarding the GUI element in which the data is displayed. Said another way, during and/or after execution of the program, and in response to user input, the data associated with the program may be saved, as well as information about the GUI element. Thus, the method may include recording the data (in response to user input), and may further include saving information as to how the data were displayed. In one embodiment, saving the data further may include saving a timestamp for the saved data indicating when the data were saved, and/or an indication of the source of the saved data.

The saved data may be displayed in a second instance of the GUI element in response to user input invoking display of the saved data, based on the saved information regarding the GUI element. In other words, data that were displayed in the first instance of the GUI element and saved in response to user input may be displayed in a second instance of the GUI element using the saved information regarding the GUI.

In one embodiment, the method may further include repeating the above executing the program and saving the data one or more times in an iterative manner, thereby generating multiple saved data sets. Additionally, respective specified saved data sets may be displayed in respective second instances of the GUI element in response to respective user input invoking display of the respective specified saved data sets. In other words, during execution of the program (and possibly across multiple executions), the user may periodically invoke saving of displayed data, and may subsequently invoke display of specified saved data sets.

Thus, for example, in one exemplary use case, a user may create a program (or receive a program from a source), e.g., a graphical program, such as a LabVIEW VI, and run or execute it multiple times, where on each run, one or more inputs to the program may be changed, e.g., by the user. During or after each run, the user may invoke a save of the displayed data, e.g., may take a front panel "snapshot", after which the user may invoke display of some or all of the results. In another exemplary use case, a user may run (execute) a VI and take a GUI snapshot of the results, after which the user may generate a report on the results in a word processor. It should be noted that, as used herein, the term "snapshot" does not refer to a screen image capture, at least because the data displayed in the GUI are saved, and because information regarding the GUI element whereby the data are displayed is saved, as well.

BRIEF DESCRIPTION OF THE DRAWINGS

A better understanding of the present invention can be obtained when the following detailed description of the preferred embodiment is considered in conjunction with the following drawings, in which.

Figure 1A:
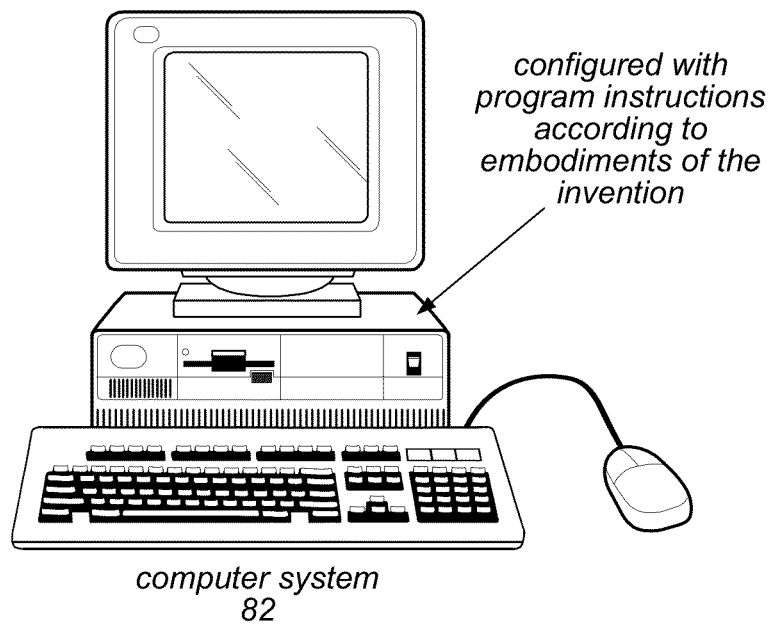
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 configured with program instructions implementing an embodiment of the present invention. One embodiment of a method for recording and displaying data from a program is described below.

As shown in FIG. 1A, the computer system 82 may include a display device operable to display a program as the program is created and/or executed, as well as data associated with the program, e.g., input and/or output of the program. The display device may also be operable to display a graphical user interface or front panel of the graphical program during execution of the program, and may further be operable to display data associated with the program that has been previously recorded, e.g., input and/or output of the program, in response to user input. The graphical user interface may comprise any type of graphical user interface, e.g., depending on the computing platform, as will be discussed in more detail below.

The computer system 82 may include at least one memory medium on which one or more computer programs or software components according to one embodiment of the present invention may be stored. For example, the memory medium may store one or more programs which are executable to perform the methods described herein. Additionally, the memory medium may store a programming development environment application used to create and/or execute such graphical programs, and to record and display data associated with the program, as described herein. The memory medium may also store operating system software, as well as other software for operation of the computer system. Various embodiments further include receiving or storing instructions and/or data implemented in accordance with the foregoing description upon a carrier medium.

It should be noted that in various embodiments, the program or programs discussed herein may be textual programs, e.g., programs written in textual programming languages such as C, C++, FORTRAN, JAVA™, and so forth, or may be graphical programs, such as those developed in the LabVIEW™ graphical program development environment provided by National Instruments Corporation. As noted above, as used herein, a graphical program includes a plurality of interconnected nodes or icons that visually represent functionality of the program. For example, the graphical program may include a block diagram that includes the plurality of interconnected nodes, and may also include a graphical user interface (GUI), which may be referred to as a front panel, and which may include one or more controls or indicators for entering and displaying data to and from the program. In some embodiments, the graphical programs may be graphical data flow programs.

Figure 1B:
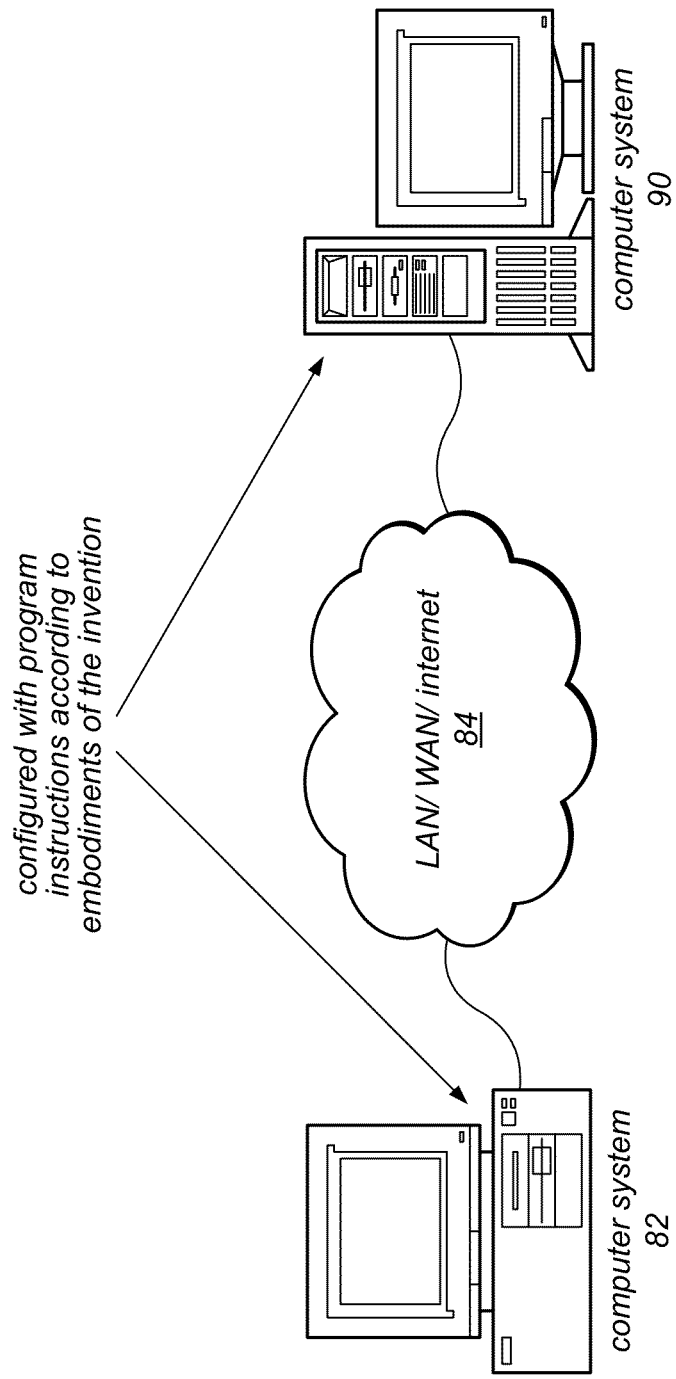
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, in embodiments where the program is a graphical program, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
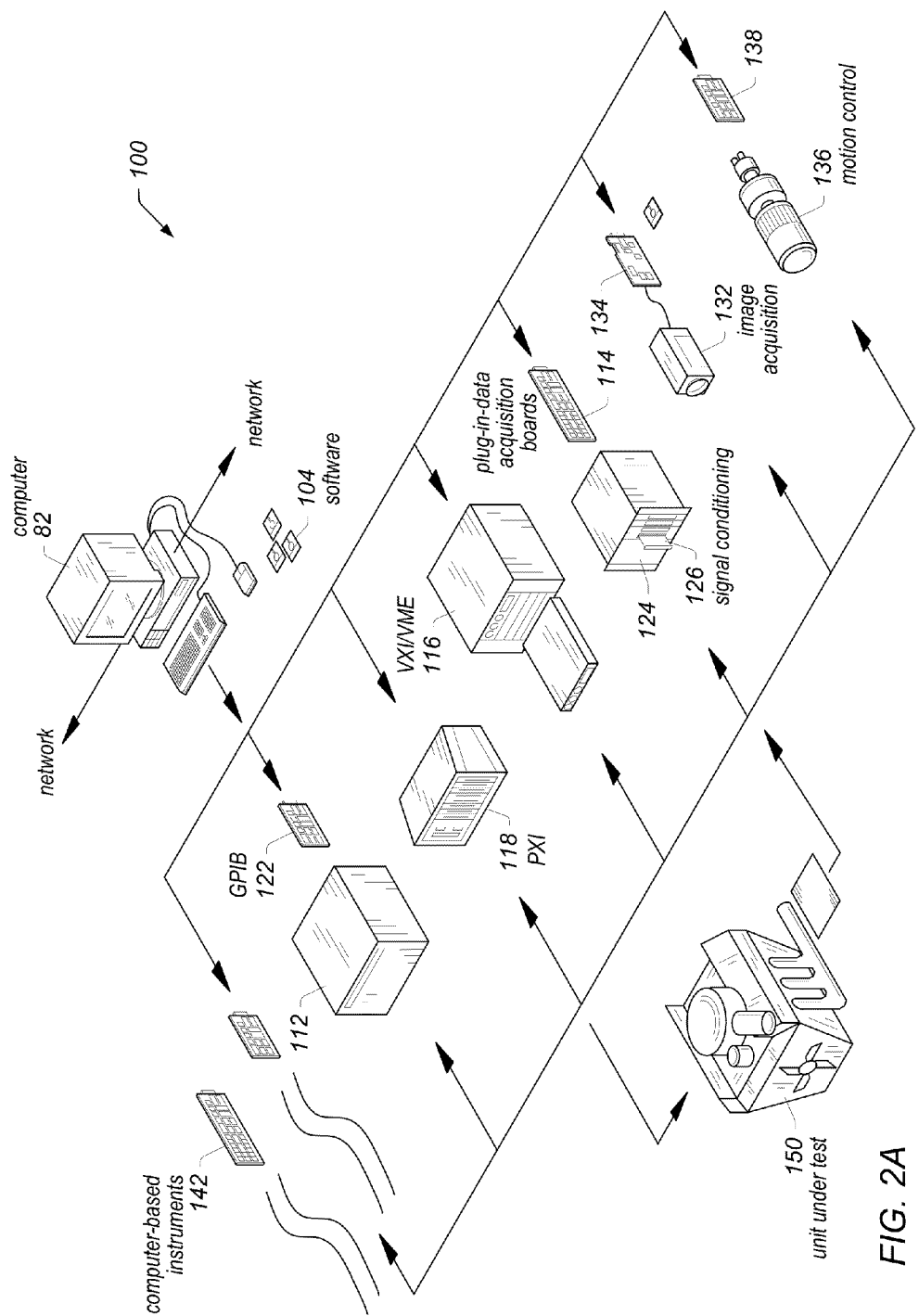
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
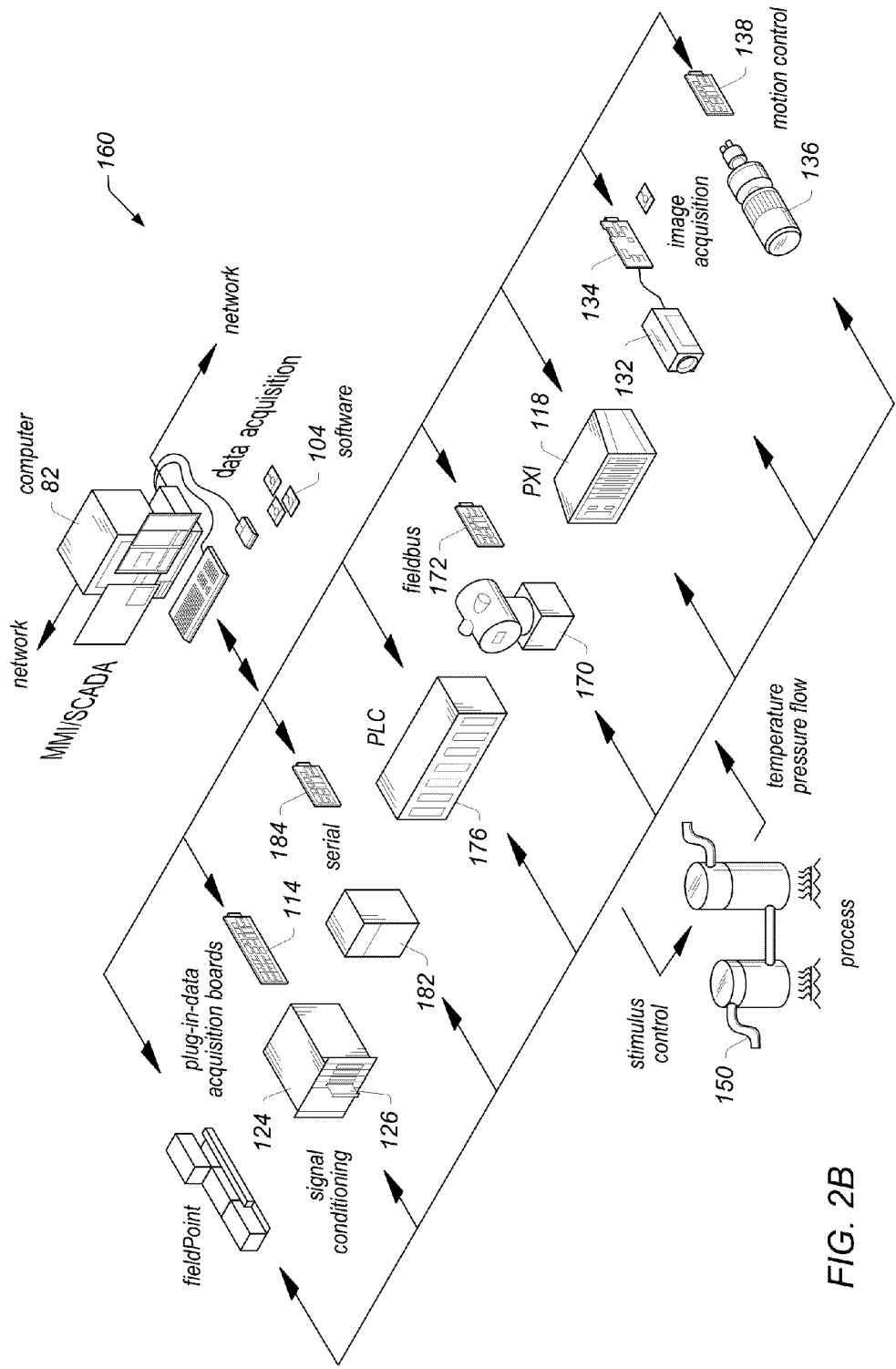
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
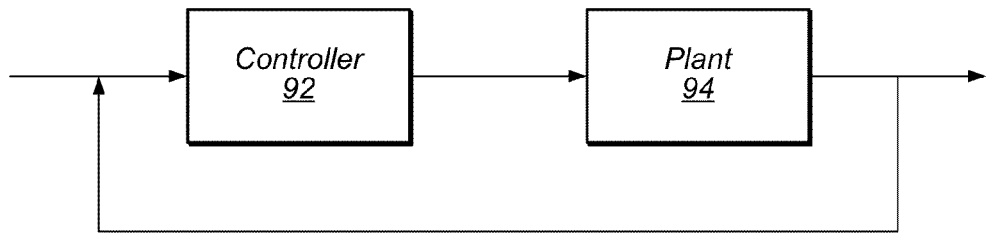
FIG. 3A is a high level block diagram of an exemplary system which may execute or utilize graphical programs.

FIG. 3A is a high level block diagram of an exemplary system which may execute or utilize programs, e.g., graphical programs, according to embodiments of the present invention. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program that specifies or implements the functionality of one or both of the controller 92 and the plant 94. For example, a control engineer may use a modeling and simulation tool to create a model (e.g., a graphical program) of the plant 94 and/or to create the algorithm (graphical program) for the controller 92.

Figure 3B:
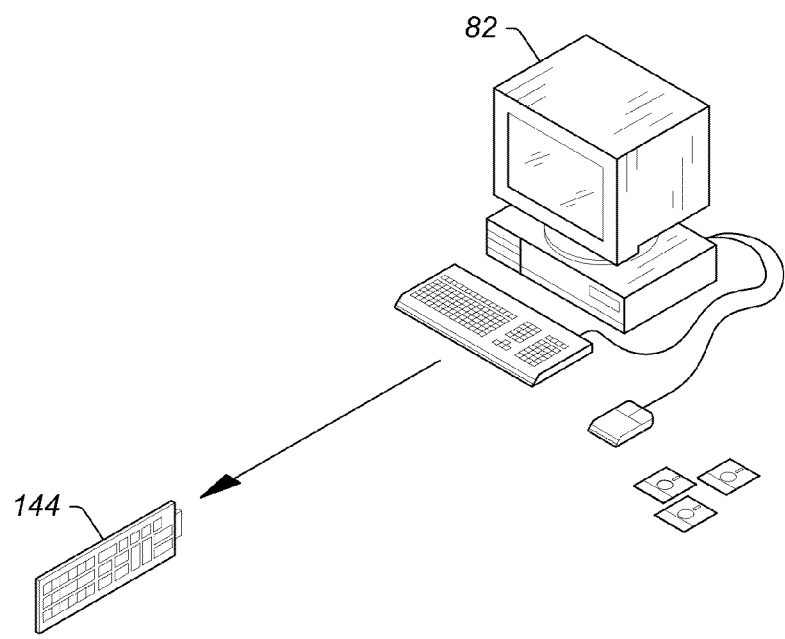
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user may select a target device from a plurality of possible target devices for programming or configuration using a program.

Thus the user may create a program on a computer and use (execute) the program on that computer or deploy the program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
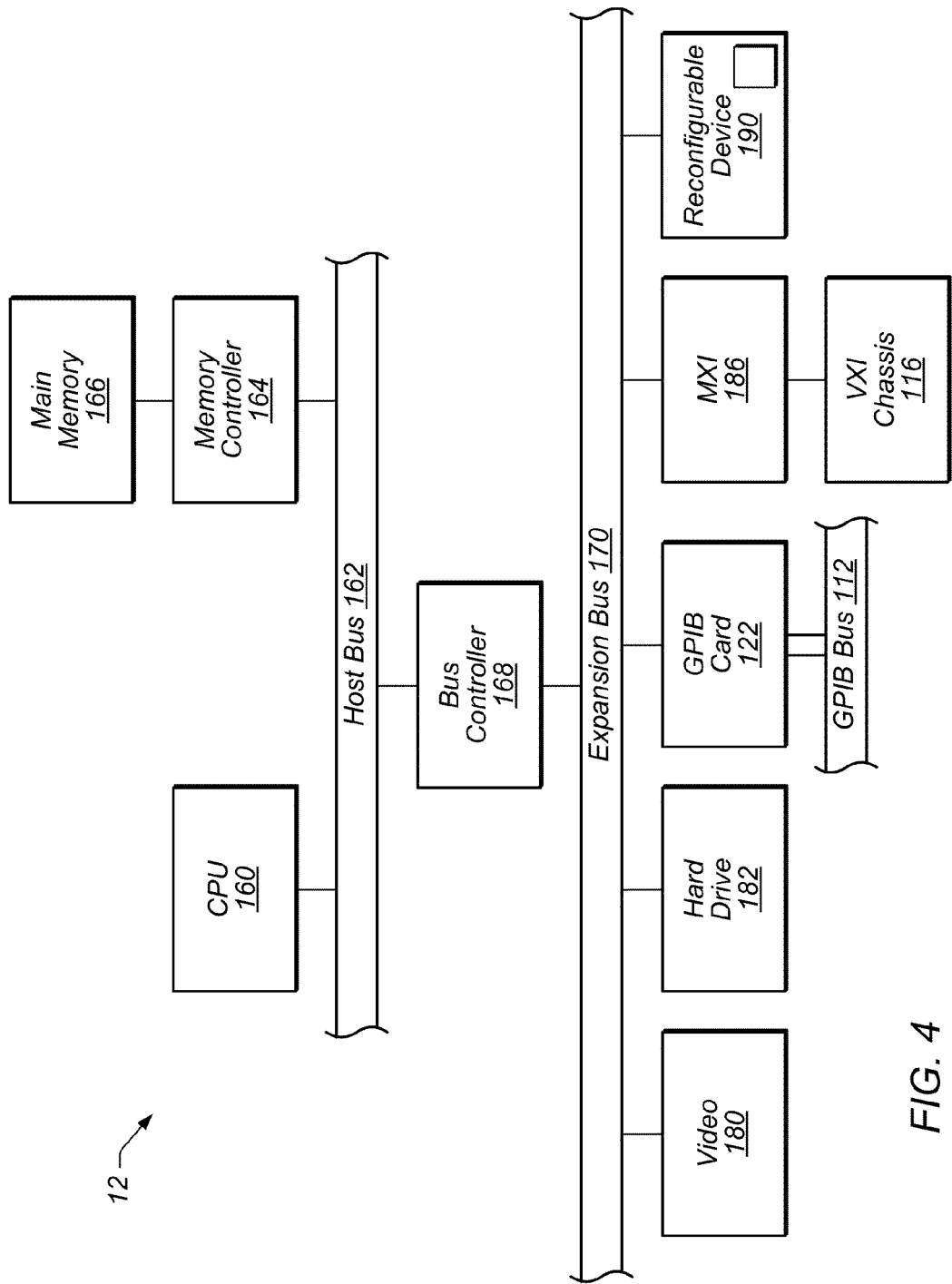
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program code implementing a program development environment operable to record and display data associated with a program, e.g., input and/or output of the program. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. As noted above, the deployed program may be textual in nature, or may be a graphical program, which may take the form of graphical program instructions or data structures that directly represent the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
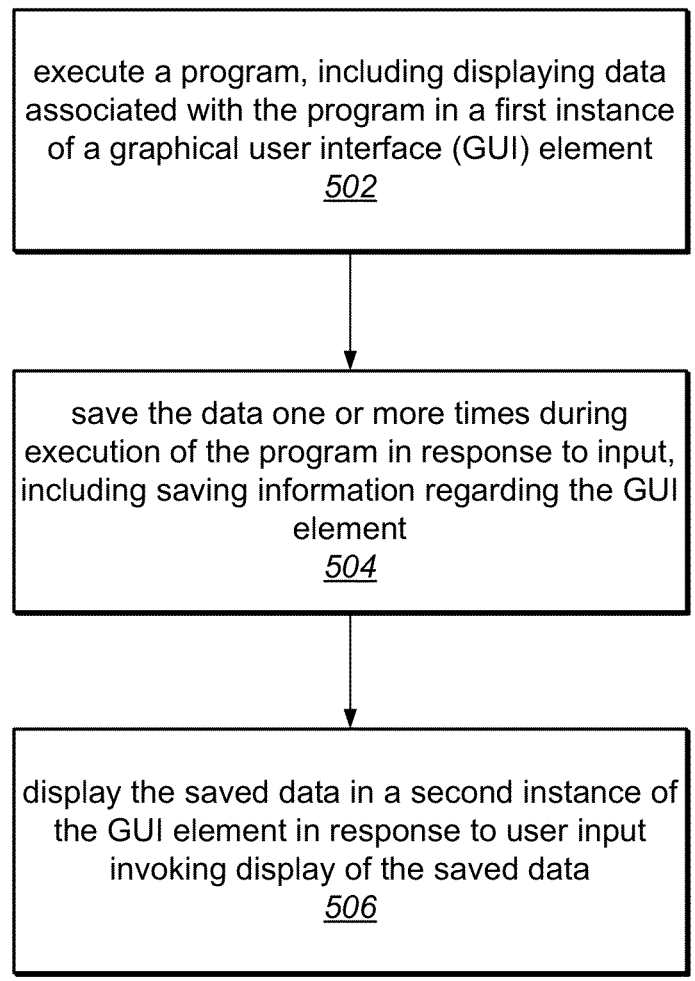
FIG. 5 is a flowchart diagram illustrating one embodiment of a method for recording and displaying data from a program.

FIG. 5—Flowchart of a Method for Recording and Displaying Data Associated with a Program FIG. 5 illustrates a method for recording and displaying data associated with a program, e.g., input and/or output of the program, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a program may be executed, where executing the program may include displaying data associated with the program in a first instance of a graphical user interface (GUI) element. In other words, during execution of the program, input and/or output data of the program may be displayed in a GUI. In some embodiments, the data may continue to be displayed after execution of the program is complete, e.g., the first instance of the GUI may still be visible (with the displayed data) after execution of the program.

In 504, the data may be saved one or more times during and/or after execution of the program in response to input, including information regarding the GUI element. Said another way, during and/or after execution of the program, and in response to user input, the data associated with the program may be saved, as well as information about the GUI element. Thus, the method may include recording the data (in response to user input), and may further include saving information as to how the data were displayed. In one embodiment, saving the data further may include saving a timestamp for the saved data indicating when the data were saved, and/or an indication of the source of the saved data.

In 506, the saved data may be displayed in a second instance of the GUI element in response to user input invoking display of the saved data, based on the saved information regarding the GUI element. In other words, data that were displayed in the first instance of the GUI element and saved in response to user input may be displayed in a second instance of the GUI element using the information regarding the GUI saved in 504.

In one embodiment, the method may further include repeating the above executing the program and saving the data one or more times in an iterative manner, thereby generating multiple saved data sets. Additionally, respective specified saved data sets may be displayed in respective second instances of the GUI element in response to respective user input invoking display of the respective specified saved data sets. In other words, during execution of the program (and possibly across multiple executions), the user may periodically invoke saving of displayed data, and may subsequently invoke display of specified saved data sets.

Thus, for example, in one exemplary use case, a user may create a program (or receive a program from a source), e.g., a graphical program, such as a LabVIEW VI, and run or execute it multiple times, where on each run, one or more inputs to the program may be changed, e.g., by the user. During or after each run, the user may invoke a save of the displayed data, e.g., may take a front panel "snapshot", after which the user may invoke display of some or all of the results. In another exemplary use case, a user may run (execute) a VI and take a GUI snapshot of the results, after which the user may generate a report on the results in a word processor. It should be noted that, as used herein, the term "snapshot" does not refer to a screen image capture, at least because the data displayed in the GUI are saved, and because information regarding the GUI element whereby the data are displayed is saved, as well. This is in direct contrast with screen image captures, which simply save image or pixel data, although in some embodiments such image captures may also be supported, as described below.

Further Embodiments

The following describes various exemplary embodiments of the above method. However, it should be noted that the embodiments presented are not intended to limit the invention to any particular form, function, or appearance.

In one embodiment, executing the program may include executing the program in a development environment, e.g., an integrated development environment (IDE). Thus, for example, the first instance of the GUI element may be included in a GUI of the program, or a GUI of a debugger in the development environment. The second instance of the GUI element may be included in a data viewer that is included in or is part of the development environment, although the term "data viewer" is not meant to limit the functionality disclosed to any particular functionality or appearance. Thus, the environment in which the program is executed may be operable to not only save data associated with the program and information regarding the GUI element in which the data were displayed, but may also be operable to (re)display the data in another instance of the GUI element based on the saved information.

Moreover, in further embodiments, the development environment may provide further functionality regarding display of data associated with the program. For example, in various embodiments, the data viewer may include a GUI for specifying or invoking navigation between the data viewer and an editor in the development environment for editing the program, a different GUI element for displaying the saved data, configuration of one or more GUI elements for display of saved data, annotations for the saved data, export of previously saved data, and/or export of an image of displayed data, among other data-related functionality.

In some embodiments, the data viewer may include a GUI for displaying a type of the GUI element or data type of the displayed saved data. Thus, the data viewer (of or in the development environment) may provide means whereby the user may specify or invoke any of various data-related functions. By providing an integrated way of viewing data, the user may be spared having to resort to external programs to perform common data tasks, i.e., the user is not required to leave the development environment to use, view, or otherwise manage, data of or for the program.

Note that the GUI element may be of any type desired. For example, in one embodiment, the data associated with the program may include plural data elements, e.g., may have multiple elements of data, and so the GUI element may be a compound GUI element that includes multiple constituent GUI elements. Thus, displaying data associated with the program in a first instance of a graphical user interface (GUI) element may include displaying the plural data elements in respective first instances of the constituent GUI elements, and displaying the saved data in a second instance of the GUI element may include displaying the saved data elements in respective second instances of the constituent GUI elements. Note that this functionality admits display of composite or even hierarchical data, e.g., nested data, data in heterogeneous data structures, or data of complex class objects, where the GUI element(s) may be as complex as necessary to display the data.

In some embodiments, the user may change or otherwise specify how the saved data are displayed. For example, user input specifying a different GUI element for display of the saved data may be received, and information regarding the different GUI element may be saved, e.g., by the development environment (possibly the data viewer). The saved data may then be displayed in an instance of the different GUI element in response to further user input invoking display of the saved data. This alternate means for displaying the saved data may be specified for use a single time, during the current session or execution of the program, or until another GUI element is specified for displaying the save data.

In one embodiment, specifying a different GUI element for display of the saved data may include specifying a default GUI element for display of the saved data. For example, in one embodiment, the saved data has a data type (which may be simple or compound, flat or hierarchical). The different GUI element may include a default GUI element for display of one or more of: any saved data of the data type, any saved data of the data type associated with the program, or any saved data associated with the program that was originally displayed in the first instance of the GUI element.

Thus, various embodiments of the above method may be used to generate, view, save, and display data of or for a program within a development environment.

Figure 6:
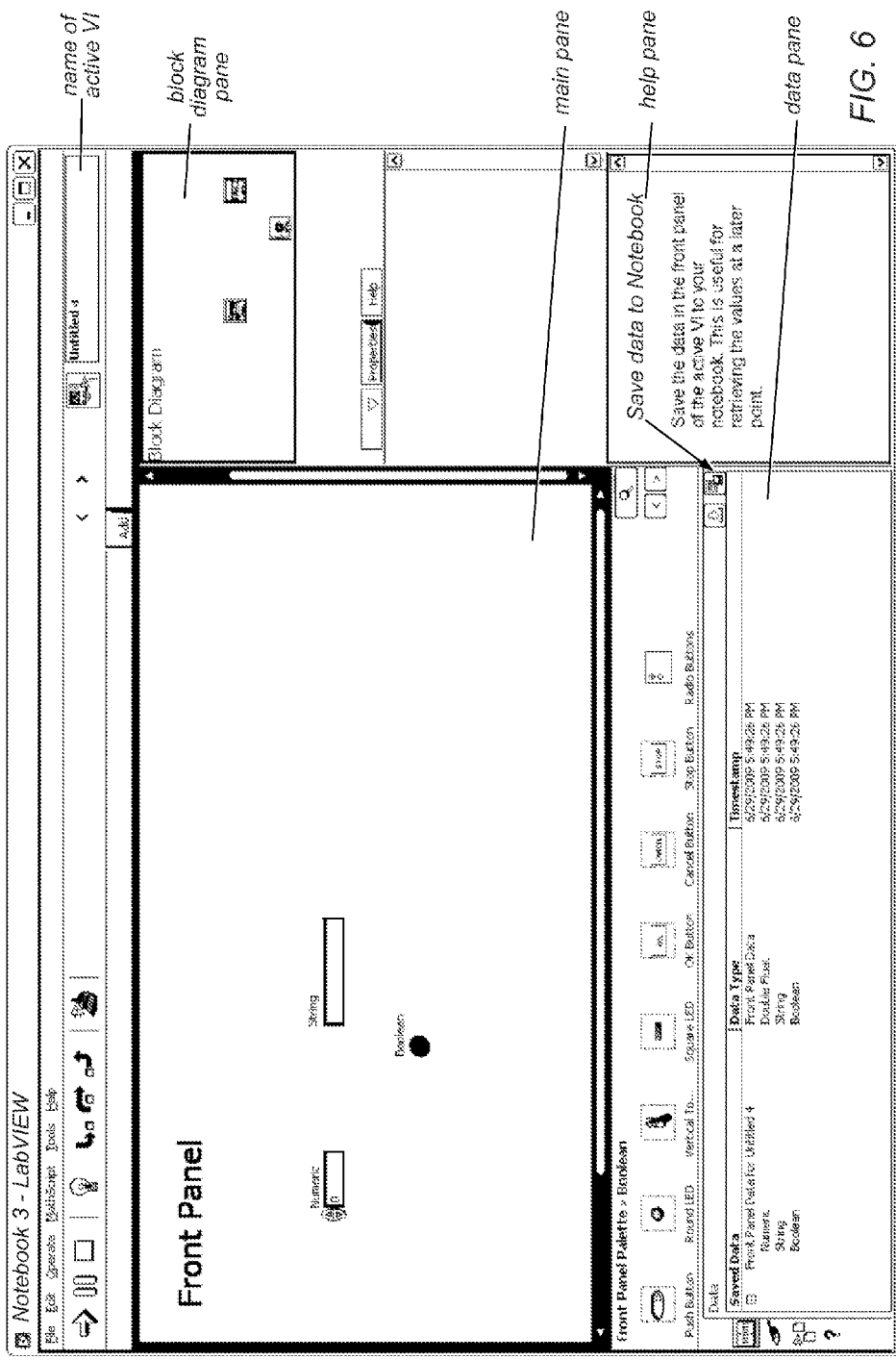
FIG. 6 illustrates a screenshot of an exemplary integrated development environment (IDE) with data viewer functionality, according to one embodiment.

FIG. 6—Exemplary Integrated Development Environment

FIG. 6 illustrates a screenshot of an exemplary integrated development environment (IDE) with data viewer functionality, according to one embodiment. In this particular example, the IDE's GUI includes multiple panes for displaying various items, specifically, a main pane wherein a GUI of an executing (or just executed) program may be displayed, in this case, a front panel of a graphical program or VI, a data pane for displaying saved data sets, as well as a pane for displaying the source code of the program, e.g., the block diagram of the graphical program or VI, here shown in the upper right of the GUI, and a help pane for providing helpful information to the user regarding the IDE, the data viewer(s), the program, etc., as desired.

As may be seen, in this example, the front panel, so labeled, includes a numeric control, a string field or control, and a Boolean control or indicator, each operable to display respective data for or from the program. Note that the data pane is operable to display a list of saved data sets, where in this example, each data set, if compound, may be expanded to display its constituent data elements, here indicated as "Numeric", "String", and "Boolean", along with respective time stamps for the data set and the data elements contained therein.

In this example the data pane also includes a toolbar icon or button (at the top right of the data pane, and indicated by the adjacent annotation "Save data to Notebook") whereby the user may invoke a data save (a "snapshot"). In other words, a button on the data pane toolbar may allow users to take a snapshot of the data on the program's front panel, thereby adding the data to a "Saved Data" section of the data pane (see the "Front Panel Data for Untitled 4" data set). Moreover, in the embodiment shown, the user may "drill into the data" for each control individually, as indicated by the "−" to the left of the data set, resulting in display of the data set's constituent data elements, as shown. Alternatively, instead of taking a snapshot of the entire front panel, the user may take a snapshot of an individual control, whose data may then be stored by itself and displayed in the Saved Data section. In another embodiment, the buttons to save data or images may be in other locations, such as the top-level toolbar or menus.

Thus, in response to the user activating or invoking a data save (i.e., a snapshot) for this program, a data set, e.g., similar to that shown in the data pane, may be saved and subsequently listed in the data pane.

Note that if the user subsequently clicks on the "Front Panel Data for Untitled 4" in the data pane, the snapshot (i.e., data and GUI element(s)) of the front panel data that was previously saved may be loaded and displayed, e.g., in the main pane.

Similarly, if the user clicks on or otherwise activates saved data associated with an individual control, a data viewer for that control may be loaded and displayed (with its data). Additionally, as discussed above, in some embodiments, the data viewers may be configured or re-configured, altering the way the associated data are displayed. For example, an array data viewer may be configured, e.g., via a drop down menu, to display the data as a table or on a graph. As another example, a graph data viewer may present scale and plot type options for changing how the data are graphed.

In some embodiments, saved data may also be copied and pasted to other programs or VIs, and/or exported to external programs, such as word processors, spreadsheets, and so forth.

After such saves, the saved data sets may then be displayed and viewed via a data viewer, as described in detail below with reference to FIGS. 7-10.

FIGS. 7-10—Example Data Viewers

FIGS. 7-10 illustrate exemplary embodiments of a GUI of a development environment with an integrated data viewer. The following describes examples of data viewers and their use, according to exemplary embodiments where the program is a graphical program, specifically, a LabVIEW VI that includes a block diagram and a GUI, referred to as a front panel, although it should be noted that the features and functionalities disclosed may be broadly applicable to other types of programs as well.

In some embodiments, the data viewer may be operable to display any data that can be saved under the development environment, which may include data displayed in an entire front panel, any data that can be displayed in a front panel control or indicator, and/or any data that can be displayed in a probe, e.g., in a debugger or debugging GUI.

Figure 7:
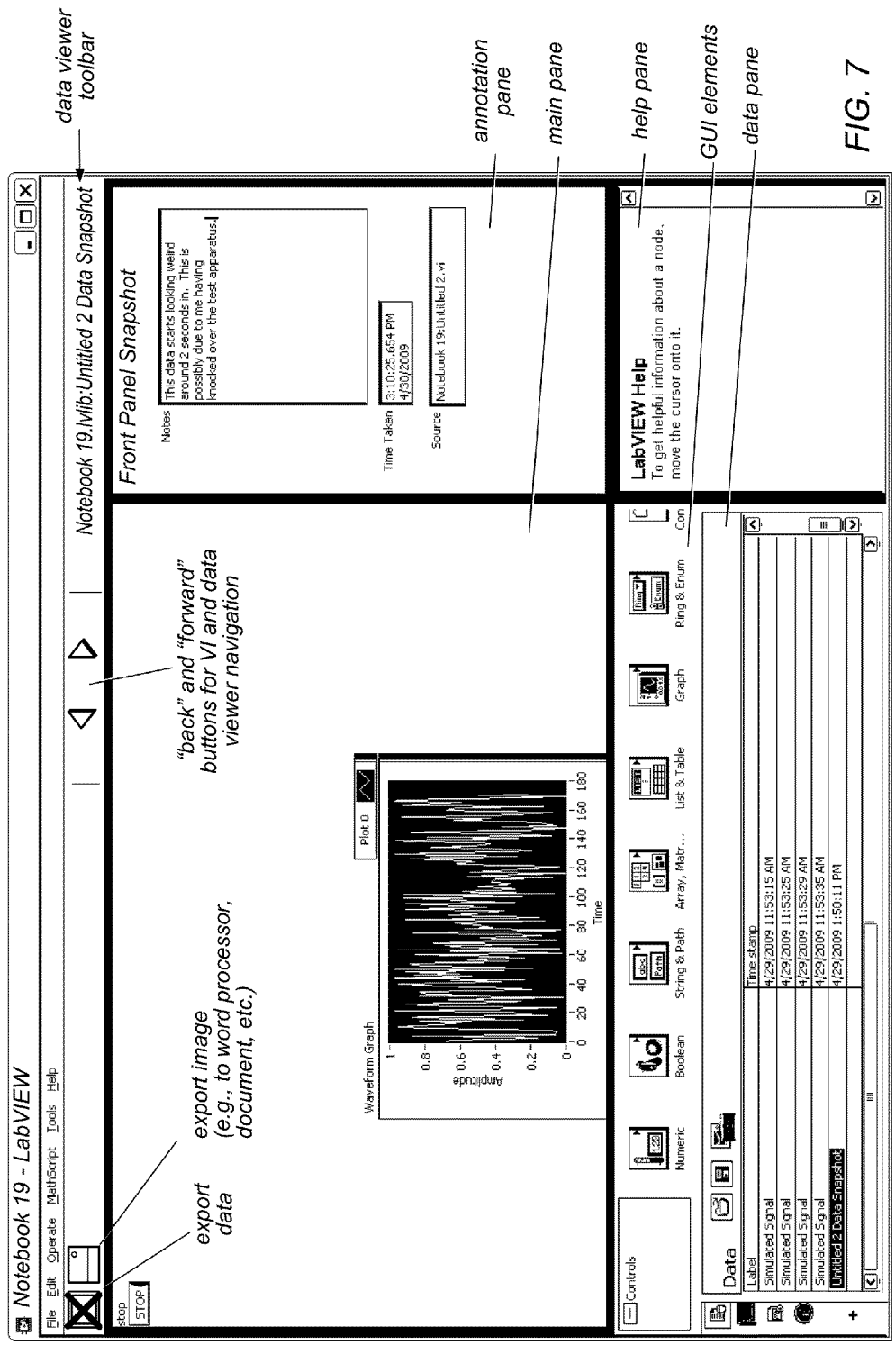
FIG. 7 illustrates a screenshot of an exemplary front panel data viewer, according to one embodiment.

FIG. 7 illustrates a screenshot of an exemplary front panel data viewer, according to one embodiment. In one embodiment, the user interface (UI) of the data viewer may fit within a pane, e.g., a main pane, of an editor of the development environment. Moreover, in some embodiments, the data viewer may be invocable via a user opening or accessing a saved data set, e.g., from within the development environment, e.g., via a file browser or "explorer" of the development environment.

In the exemplary embodiment of FIG. 7, the data viewer screen includes such a main pane wherein the data viewer GUI element (possibly compound) instance is displayed, as well as a data viewer toolbar and menus for invoking or specifying various functions, a data pane whereby saved data sets may be selected and/or managed, and one or more configuration panes, such as the annotation pane shown. This embodiment also includes a help pane for providing helpful information to the user. Further details regarding these components are now presented.

As may be seen, the main pane of this data viewer displays a GUI element that itself displays a waveform graph, titled "Plot 0". In one embodiment, e.g., in a program execution or editor mode, this pane may also be operable to display the program GUI (front panel), as shown in FIG. 7, or source code of the program, e.g., the block diagram of a graphical program, i.e., a VI, e.g., the main pane may be a program editor pane or window in the development environment.

In the embodiment shown, navigation between the program, e.g., the program GUI or the VI block diagram (graphical source code) display, and the data viewer may be via "back" and "forward" navigation buttons above the main pane on a toolbar, although any other means may be used as desired, e.g., an onscreen toggle switch, menu option, etc. As shown, the main pane may be operable to display a current data viewer, including the second instance of the GUI element mentioned above, in this case, a waveform graph. In some embodiments, the data viewer display (second GUI instance) may be visually distinguished from that of the program (first GUI instance), e.g., so as not to confuse the user. In other words, it may be made clear that the data viewer is not a front panel (GUI) of the program using any of a variety of graphical techniques to do so. For example, the data viewer GUIs may be displayed with a texture, color, style, and/or other visual feature that is unique and visually distinct from the default attributes of a front panel.

Additionally, the inclusion of a data viewer toolbar (that may replace the program editor's toolbar when the data viewer is invoked) may also help users distinguish data viewers from VI front panels, as well as provide access to specific data viewer functions. In one embodiment, the data viewer toolbar may use the same or similar navigation buttons (e.g., in the same location) as the editor toolbar, and may also display the name of the saved data set in the same place that the program or VI name is displayed on the editor toolbar.

As noted above, in some embodiments, the data viewer may be operable to export saved data. For example, in one embodiment, the data viewer may support report generation, e.g., sending saved data to a word processor or spreadsheet program, or templates thereof. Thus, in addition to the elements it shares with the editor toolbar, e.g., navigation buttons, the data viewer toolbar (or more generally, the GUI) may include two export buttons, as shown in FIG. 7. In the exemplary embodiment shown, the left button, labeled "export data", may be used to export the data the user is currently viewing, and the right button, labeled "export image", may be used to export an image, e.g., an image capture of the displayed GUI/data. Additionally, in some embodiments, the data viewer may be operable to edit the saved or displayed data, e.g., in response to user input.

In one embodiment, the data viewer GUI may include means whereby the user may change the view or GUI element used to display saved data. For example, in the embodiment of FIG. 7, a palette of selectable GUI element types, labeled "GUI elements", is shown below the main pane. The palette may be used to change the current view for any applicable data types. For example, the user may be viewing a ID array of numeric data, and may switch from an "Array Control" view to a "Graph" view. In some embodiments, the view change operation may not be allowed on front panel snapshots, so for these, the palette may be hidden. Note that the palette shown is simply one of a variety of means for specifying the view or GUI element for display of saved data, and that any other techniques or GUIs may be used as desired, e.g., ring controls, drop-down menus, pop-up menus, and so forth.

Thus, for example, whenever a user opens a saved data set, the editor (or development environment) may invoke display of a respective data viewer in the main pane, replacing whatever was currently in the main pane, and possibly minimizing any secondary panes belonging to or associated with the main pane (as editor window). Note that the term "data viewer" may refer to the overall data viewing functionality of the development environment, or may refer to a particular instance of the functionality, e.g., with respect to display of a particular saved data set. Thus, when multiple data sets have been saved, one may consider the display of each data set to be via a respective data viewer, or by a single data viewer configured appropriately for each data set, e.g., based on the saved GUI element information. For simplicity, in the descriptions below, references to a particular data viewer may be interpreted as either, e.g., a distinct data viewer, or a more general data viewer functionality with a distinct configuration.

In some embodiments, data viewers (or data viewer configurations) may be included in a "history" which may be navigated using the back and forward buttons shown in the data viewer toolbar, mentioned above and shown in FIG. 7, and so, not only can the user navigate between the editor and the data viewer(s), but between data viewers (or data viewer configurations), as well. Moreover, this functionality may also apply to multiple edit windows or sessions, e.g., where different portions of the program, or even different programs, may be edited and displayed in navigable panes. Thus, a user may navigate between data viewers (or configurations) and edit sessions or windows in accordance with history information via the back and forward buttons (or via other means as desired).

Data viewer invocation and display may be configurable, e.g., by a user or programmatically. For example, a data viewer may be configured (possibly by default) to not automatically open in a new tab, but may be easily opened in a new tab, should the user desire, e.g., via a pop-up menu, etc.

As noted above, in various embodiments, each data type may have a corresponding data viewer, or a corresponding configuration of the data viewer, including a specified GUI element. For data types that have more than one valid view or appropriate GUI element, users may be able to switch between views of their data (i.e., GUI element used to display the data), e.g., using a palette, a drop-down menu on the data viewer toolbar, a pop-up menu, or via other GUI means as desired. For example: an array of doubles can be viewed as a table or a graph, and so the user may specify either GUI element (table or graph) as desired. Users may also be able to create custom views, e.g., and may be able to add them to the selectable view/GUI element options. As noted above, the user may also be able to set a particular view as the default view for that data type, so that any time data of that type are first brought into a data viewer, it will be displayed with that view/GUI element.

The GUI element or viewer for a compound data type may be generated by combining the default GUI elements or viewers of its constituent data types. Thus, in some embodiments, users may be able to select and change the GUI elements or views of respective parts of the compound type. Moreover, users may also be able to create custom views for compound data types, specifying or even creating individual GUI elements and/or combinations of GUI elements, as desired.

In some embodiments, the data viewer (or data viewers) may handle data views (snapshots, as defined above) of the entire front panel (program GUI) differently from data views of just portions of the displayed data. For example, in one embodiment, a front panel snapshot is more than just stored data: it is a copy of the entire front panel of the VI from which the snapshot was taken. As such, in some embodiments, the data viewer (or data viewer configuration) for a front panel snapshot may not have quite the same functionality as other data viewers (or data viewer configurations). For example, in one embodiment, the front panel snapshot viewer will be similar to the front panel of a VI (or, more generally, the GUI of a program), except that the objects, i.e., GUI elements, on it may be immovable and the VI (program, or GUI portion of the program) may not be executable. In one embodiment, because the front panel viewer is specific to the front panel itself, the user may not be allowed to modify the types of the GUI elements used to display the data sets. However, users may still be able to configure the front panel data viewer using configuration panes or popup menus to specify or change attributes of the data viewer, e.g., graph settings. In other words, the user may not be able to change the GUI element types, but may still be able to configure them.

In one embodiment, each data viewer may have its own individual configuration pane (or panes). The configuration pane(s) may be displayed whenever the data viewer is operative, or may be specifically invoked by the user, e.g., via a menu selection. Each data viewer configuration pane may include a header that contains an object label (e.g. "Numeric Data"), and may further include a generic data viewer icon, and/or "Find," "Properties" and/or "Help" buttons, among others, for configuring or managing data and/or viewers.

Data viewer configuration panes may also include an editable, persistent "Notes" text field, as shown in FIG. 7 in an "annotation pane", so labeled. As also shown, this configuration (annotation) pane may also include a non-editable timestamp indicator giving the time the data set was saved, as well as a non-editable text field showing the source of the data.

As indicated above, the data viewer may also include a data pane whereby saved data sets may be selected and/or managed (as shown in FIG. 7 at the bottom of the display). Note that in this embodiment, the data pane lists saved data sets, along with respective timestamps indicating when the data sets were saved. As shown, the listed data sets are each selectable by the user to invoke display of the selected data set.

Figure 8:
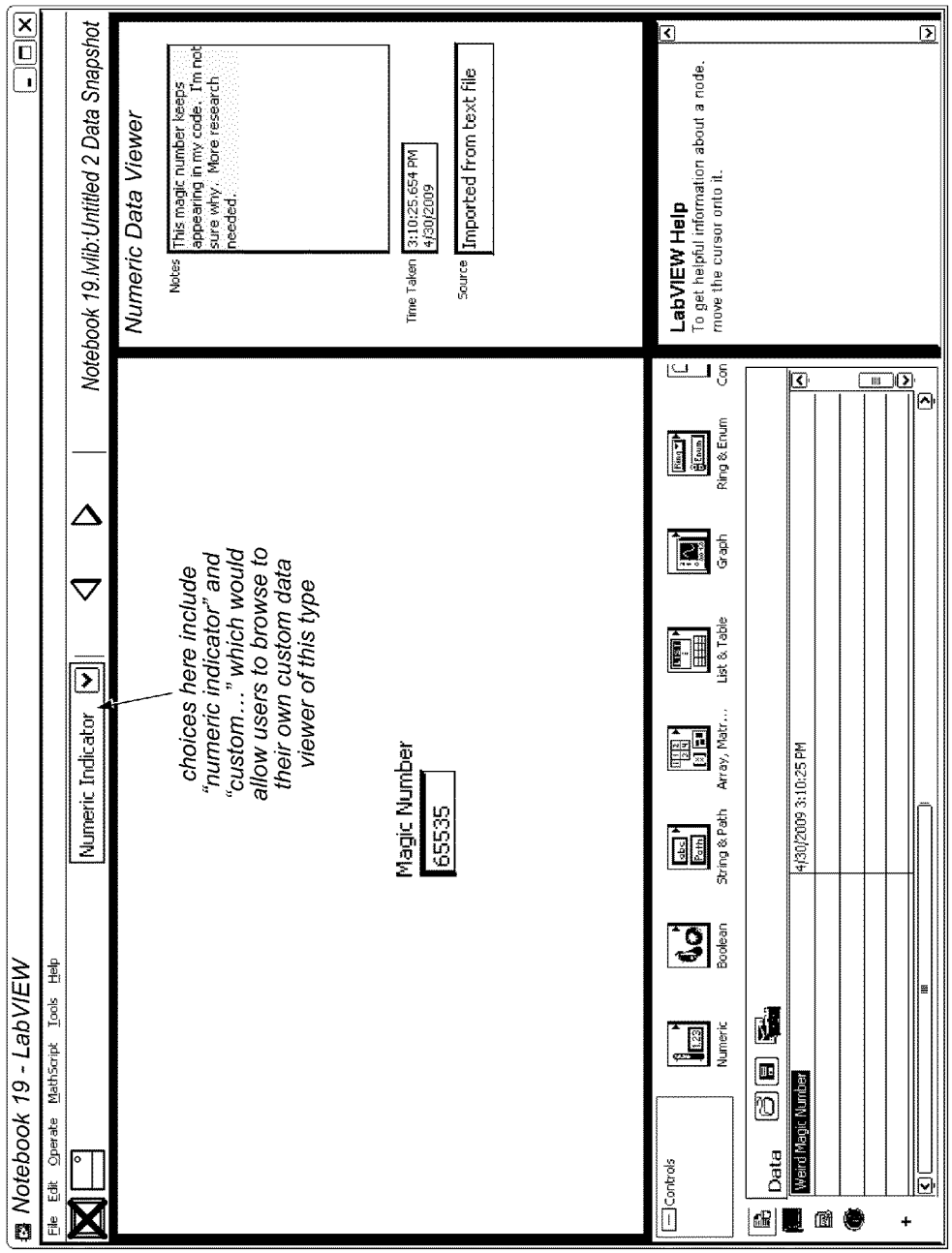
FIG. 8 illustrates a screenshot of an exemplary data viewer configured to display an integer in a numeric control, according to one embodiment.

FIG. 8 illustrates a screenshot of an exemplary embodiment of a data viewer configured to display an integer in a numeric control (which may also be referred to as a numeric indicator), labeled "Magic Number", based on a data set labeled "Weird Magic Number" (see data pane). In other words, FIG. 8 illustrates one embodiment of a numeric data viewer. As shown, in this example, the data viewer toolbar includes a ring control that allows the user to specify or change the type of GUI element used to display the saved data set. As indicated in the label/notation, this indicator includes various choices selectable by the user, including "numeric indicator", currently used, as well as a "custom . . . " option that invokes a browser or functional equivalent whereby the user may browse to their own custom data viewer or configuration, e.g., a particular GUI element for displaying the "magic number" shown, e.g., a single value bar graph, an editable or non-editable numeric field, etc.

Figure 9:
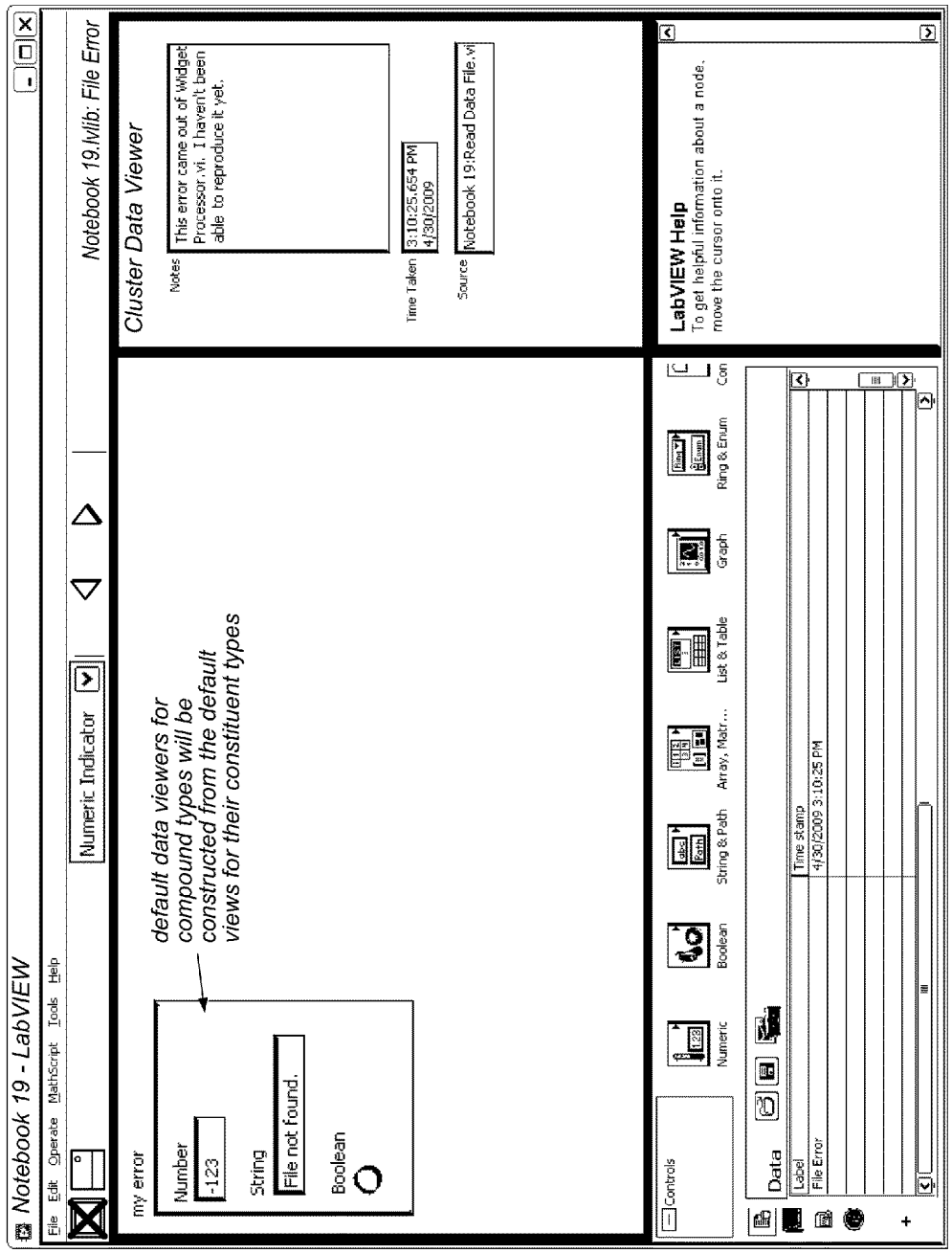
FIG. 9 illustrates a screenshot of an exemplary data viewer configured to display a compound data set, according to one embodiment.

FIG. 9 illustrates a screenshot of an exemplary embodiment of a data viewer configured to display a compound data set, e.g., a data set with multiple data elements, which may be referred to as a cluster, which in this case relate to an error generated by a "Widget Processor.vi" program. As shown, in this example, the main pane displays a compound GUI element that includes a numeric indicator (as indicated by the data viewer toolbar ring control) with the value "−123", a string control or field displaying "File not found.", and a Boolean control, all based on a data set labeled "File Error" (see data pane).

As indicated in the main pane annotation of FIG. 9, default data viewers (or data viewer configurations) for compound types may be constructed from the default views (i.e., GUI elements) for their constituent types. Thus, in some embodiments, such compound GUI elements may be determined and created automatically, i.e., without requiring user input, although subsequent changes to any or all of the GUI elements may be specified by the user, including changing such default views.

Figure 10:
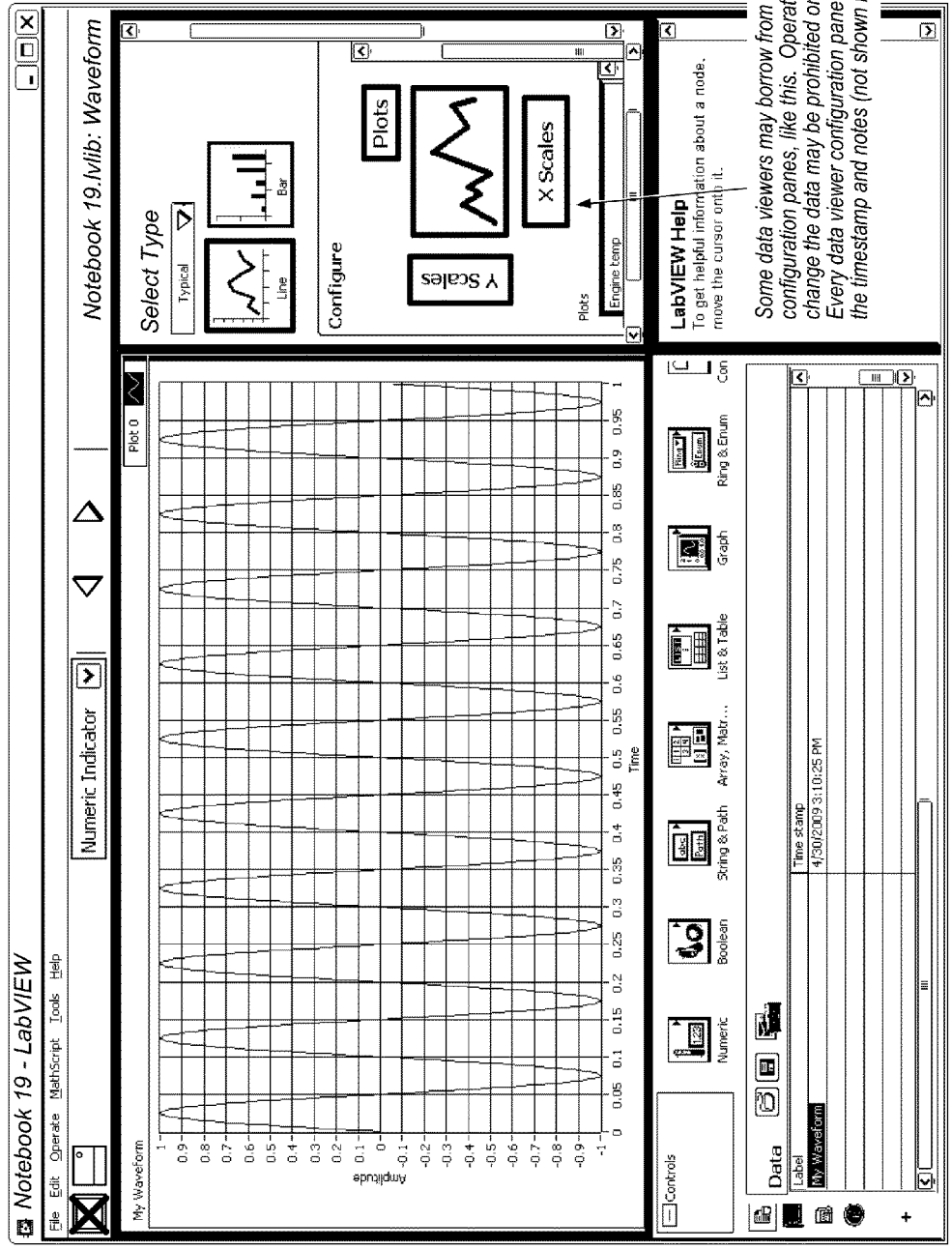
FIG. 10 illustrates a screenshot of an exemplary data viewer configured to display a waveform, according to one embodiment.

FIG. 10 illustrates a screenshot of an exemplary embodiment of a data viewer configured to display a waveform, i.e., a waveform data viewer. As may be seen, in this case, the main pane displays a graph or plot GUI element that presents a sinusoidal waveform based on a data set labeled "My Waveform" (see data pane).

In some embodiments, where appropriate, data viewer configuration panes may borrow from corresponding front panel control configuration panes to populate at least a first portion of the configuration pane, as illustrated in the configuration pane portion labeled "Configure", which in this example includes various GUI element components for plot or graph displays.

Thus, for example, when using an array control to view a 1-D array, the data viewer configuration pane may include GUI controls or menus for specifying rows and columns shown, similar to a corresponding configuration pane for a front panel control for that data type.

In an alternate embodiment, when a data viewer is invoked, e.g., when the user has opened a saved data set, the program (e.g., VI) may be displayed in a secondary pane with a split view (e.g., a diagonal split, half displaying the source code (e.g., block diagram) or a portion thereof, and half displaying the program GUI (e.g., front panel) or a portion thereof. Clicking the secondary pane may then reinstate display of the program, e.g., the block diagram and/or the GUI, e.g., displaying the front panel in the main pane, and displaying the block diagram in the secondary pane, as shown in FIG. 6. However, note that this approach subordinates the data viewer to the program, and thus undermines the goal of placing data on equal footing with the program. Moreover, displaying the program in the secondary pane while the data viewer is active may lead the user to conclude that an association between the program and the data exists where none actually does, and thereby apparently subordinates the data set to the VI.

Graphical Program Creation

The following describes one exemplary method for creating a graphical program, although other approaches may be used as desired. A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument, or any other functionality desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium that stores program instructions executable by a processor to perform:
    executing a program, comprising displaying data associated with the program in a first instance of a graphical user interface (GUI) element, wherein the data associated with the program comprise plural data elements, wherein the GUI element is a compound GUI element comprising multiple constituent GUI elements, wherein the first instance of the GUI element is comprised in a GUI of the program, and wherein said displaying data associated with the program in a first instance of a graphical user interface (GUI) element comprises displaying the plural data elements in respective first instances of the constituent GUI elements;
    saving the data one or more times during or after execution of the program in response to input, including saving information describing the GUI element; and
    displaying the saved data in a second instance of the GUI element in response to user input invoking display of the saved data, based on the saved information describing the GUI element, wherein the second instance of the GUI element is comprised in a data viewer that is separate and distinct from the program, and wherein said displaying the saved data in a second instance of the GUI element comprises displaying the saved data elements in respective second instances of the constituent GUI elements.

2. The non-transitory computer-accessible memory medium of claim 1,
    wherein said executing the program comprises executing the program in a development environment; and
    wherein the data viewer is comprised in the development environment.

3. The non-transitory computer-accessible memory medium of claim 2, wherein the data viewer includes a GUI for specifying or invoking one or more of:
    navigation between the data viewer and an editor in the development environment for editing the program;
    a different GUI element for displaying the saved data;
    configuration of one or more GUI elements for display of saved data;
    annotations for the saved data;
    export of previously saved data; or
    export of an image of displayed data.

4. The non-transitory computer-accessible memory medium of claim 1, wherein the data viewer includes a GUI for displaying one or more of:
    a type of the GUI element; or
    data type of the displayed saved data.

5. The non-transitory computer-accessible memory medium of claim 1, wherein said saving the data further comprises saving one or more of:
    a timestamp for the saved data indicating when the data were saved; or
    an indication of the source of the saved data.

6. The non-transitory computer-accessible memory medium of claim 1, wherein the program instructions are further executable to perform:
    repeating said executing the program and said saving the data one or more times in an iterative manner, thereby generating multiple saved data sets; and
    displaying respective specified saved data sets in respective second instances of the GUI element in response to respective user input invoking display of the respective specified saved data sets.

7. The non-transitory computer-accessible memory medium of claim 1,
    wherein the program instructions are further executable to perform:
    receiving user input specifying a different GUI element for display of the saved data;
    saving information describing the different GUI element; and
    displaying the saved data in an instance of the different GUI element in response to further user input invoking display of the saved data.

8. The non-transitory computer-accessible memory medium of claim 7,
    wherein said specifying a different GUI element for display of the saved data comprises specifying a default GUI element for display of the saved data.

9. The non-transitory computer-accessible memory medium of claim 8,
    wherein the saved data has a data type;
    wherein the different GUI element comprises a default GUI element for display of one or more of:
        any saved data of the data type;
        any saved data of the data type associated with the program; or
        any saved data associated with the program that was originally displayed in the first instance of the GUI element.

10. The non-transitory computer-accessible memory medium of claim 1, wherein the program comprises a graphical program comprising a plurality of interconnected nodes that visually indicate functionality of the graphical program.

11. The non-transitory computer-accessible memory medium of claim 1,
    wherein the graphical program comprises a graphical data flow program.

12. The non-transitory computer-accessible memory medium of claim 1,
    wherein the program is operable to perform one or more of:
        an industrial automation function;
        a process control function; or
        a test and measurement function.

13. A computer-implemented method for recording and displaying data associated with a program, the method comprising:
    utilizing a computer to perform:
        executing a program, comprising displaying data associated with the program in a first instance of a graphical user interface (GUI) element, wherein the data associated with the program comprise plural data elements, wherein the GUI element is a compound GUI element comprising multiple constituent GUI elements, wherein the first instance of the GUI element is comprised in a GUI of the program, and wherein said displaying data associated with the program in a first instance of a graphical user interface (GUI) element comprises displaying the plural data elements in respective first instances of the constituent GUI elements;

saving the data one or more times during or after execution of the program in response to input, including saving information describing the GUI element; and displaying the saved data in a second instance of the GUI element in response to user input invoking display of the saved data, based on the saved information describing the GUI element, wherein the second instance of the GUI element is comprised in a data viewer that is separate and distinct from the program, and wherein said displaying the saved data in a second instance of the GUI element comprises displaying the saved data elements in respective second instances of the constituent GUI elements.

14. The computer-implemented method of claim 13, wherein said executing the program comprises:

executing the program in a development environment; and wherein the data viewer is comprised in the development environment.

15. The computer-implemented method of claim 14, wherein the data viewer includes a GUI for specifying or invoking one or more of:

navigation between the data viewer and an editor in the development environment for editing the program;

a different GUI element for displaying the saved data;

configuration of one or more GUI elements for display of saved data;

annotations for the saved data;

export of previously saved data; or export of an image of displayed data.

16. The computer-implemented method of claim 13, wherein the data viewer includes a GUI for displaying one or more of:

a type of the GUI element; or data type of the displayed saved data.

17. The computer-implemented method of claim 13, wherein said saving the data further comprises saving one or more of:

a timestamp for the saved data indicating when the data were saved; or an indication of the source of the saved data.

18. The computer-implemented method of claim 13, the method further comprising:

repeating said executing the program and said saving the data one or more times in an iterative manner, thereby generating multiple saved data sets; and displaying respective specified saved data sets in respective second instances of the GUI element in response to respective user input invoking display of the respective specified saved data sets.

19. The computer-implemented method of claim 13, the method further comprising:

receiving user input specifying a different GUI element for display of the saved data;

saving information describing the different GUI element; and displaying the saved data in an instance of the different GUI element in response to further user input invoking display of the saved data.

20. The computer-implemented method of claim 19, wherein said specifying a different GUI element for display of the saved data comprises specifying a default GUI element for display of the saved data.

21. The computer-implemented method of claim 20, wherein the saved data has a data type;

wherein the different GUI element comprises a default GUI element for display of one or more of:

any saved data of the data type;

any saved data of the data type associated with the program; or any saved data associated with the program that was originally displayed in the first instance of the GUI element.

22. A system, comprising:

a processor; and a memory medium coupled to the processor, wherein the memory medium stores program instructions executable by the processor to:

execute a program, comprising displaying data associated with the program in a first instance of a graphical user interface (GUI) element, wherein the data associated with the program comprise plural data elements, wherein the GUI element is a compound GUI element comprising multiple constituent GUI elements, wherein the first instance of the GUI element is comprised in a GUI of the program, and wherein said displaying data associated with the program in a first instance of a graphical user interface (GUI) element comprises displaying the plural data elements in respective first instances of the constituent GUI elements;

save the data one or more times during or after execution of the program in response to input, including saving information describing the GUI element; and display the saved data in a second instance of the GUI element in response to user input invoking display of the saved data, based on the saved information describing the GUI element, wherein the second instance of the GUI element is comprised in a data viewer that is separate and distinct from the program, and wherein said displaying the saved data in a second instance of the GUI element comprises displaying the saved data elements in respective second instances of the constituent GUI elements.

\* \* \* \* \*